US006964748B2

(12) United States Patent
Bemis et al.

(10) Patent No.: US 6,964,748 B2
(45) Date of Patent: Nov. 15, 2005

(54) CO-INJECTION METHODS USING ENDOTHERMIC-BLOWING AGENTS AND PRODUCTS MADE THEREFROM

(75) Inventors: Peter F. Bemis, Sheboygan, WI (US); Gary Vande Berg, Fox Lake, WI (US); Steven Kolste, Sheboygan Falls, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 73 days.

(21) Appl. No.: 09/997,766

(22) Filed: Nov. 30, 2001

(65) Prior Publication Data

US 2002/0079603 A1 Jun. 27, 2002

Related U.S. Application Data

(60) Provisional application No. 60/250,222, filed on Nov. 30, 2000.

(51) Int. Cl.$^7$ .............................................. B29C 44/06
(52) U.S. Cl. ...................................... 264/54; 264/45.1
(58) Field of Search .......................... 264/54, 45.1, 46.4

(56) References Cited

U.S. PATENT DOCUMENTS

| | | | |
|---|---|---|---|
| 3,530,539 A | | 9/1970 | Gellert |
| 3,947,175 A | * | 3/1976 | Melcher ..................... 425/130 |
| 3,947,177 A | | 3/1976 | Eckardt |
| 3,966,372 A | * | 6/1976 | Yasuike et al. .............. 425/4 R |
| 3,981,661 A | | 9/1976 | Taylor |
| 4,014,966 A | * | 3/1977 | Hanning .................... 264/45.1 |

(Continued)

FOREIGN PATENT DOCUMENTS

| | | |
|---|---|---|
| EP | 0825008 | 2/1998 |
| EP | 0911138 | 4/1999 |
| JP | 59201834 | 11/1984 |

Primary Examiner—Allan R. Kuhns
(74) Attorney, Agent, or Firm—Michael Best & Friedrich LLP

(57) ABSTRACT

The invention provides a method of co-injection molding. The method includes mixing a plastic inner material and an endothermic-blowing agent to form a core mixture. A plastic outer material is injected from a first injection unit into a co-injection manifold to create a flow of outer material therethrough. The core mixture is injected from a second injection unit into the co-injection manifold to create a flow of core mixture therethrough. The flow of the outer material and the flow of the core mixture are then controlled through the co-injection manifold and into a mold cavity. The core mixture expands as heat is provided for the endothermic-blowing agent to absorb.

10 Claims, 4 Drawing Sheets

U.S. PATENT DOCUMENTS

| | | | |
|---|---|---|---|
| 4,083,903 A | | 4/1978 | Gilbert et al. |
| 4,106,887 A | * | 8/1978 | Yasuike et al. ............. 425/549 |
| 4,124,308 A | | 11/1978 | Sokolow |
| 4,126,291 A | | 11/1978 | Gilbert et al. |
| 4,129,635 A | * | 12/1978 | Yasuike et al. ............ 264/45.5 |
| 4,155,969 A | * | 5/1979 | Hendry ...................... 264/45.1 |
| 4,213,751 A | | 7/1980 | Fernandez |
| 4,219,323 A | | 8/1980 | Bright et al. |
| 4,268,240 A | | 5/1981 | Rees et al. |
| 4,279,582 A | | 7/1981 | Osuna-Diaz |
| 4,315,724 A | | 2/1982 | Taoka et al. |
| 4,333,629 A | | 6/1982 | Roy |
| 4,376,625 A | * | 3/1983 | Eckardt ...................... 425/564 |
| 4,381,272 A | | 4/1983 | Ehritt |
| 4,497,621 A | | 2/1985 | Kudert et al. |
| 4,501,550 A | | 2/1985 | Nikkuni |
| 4,542,054 A | * | 9/1985 | Fillmann ..................... 428/68 |
| 4,563,147 A | | 1/1986 | Langecker |
| 4,588,367 A | | 5/1986 | Schad |
| 4,657,496 A | | 4/1987 | Ozeki et al. |
| 4,682,945 A | | 7/1987 | Schad |
| 4,712,990 A | | 12/1987 | Kudert et al. |
| 4,717,324 A | | 1/1988 | Schad et al. |
| 4,749,554 A | | 6/1988 | Proksa et al. |
| 4,752,199 A | | 6/1988 | Arai |
| 4,775,308 A | | 10/1988 | Schad et al. |
| 4,789,318 A | | 12/1988 | Ehritt |
| 4,806,294 A | | 2/1989 | Lapierre et al. |
| 4,808,101 A | | 2/1989 | Schad et al. |
| 4,889,477 A | | 12/1989 | Wortberg et al. |
| 4,925,100 A | | 5/1990 | Kudert et al. |
| 4,931,234 A | | 6/1990 | Schad et al. |
| 4,934,915 A | | 6/1990 | Kudert et al. |
| 4,944,909 A | | 7/1990 | Eckardt et al. |
| 4,946,365 A | | 8/1990 | Kudert et al. |
| 4,950,143 A | | 8/1990 | Krishnakumar et al. |
| 5,009,809 A | | 4/1991 | Kosin et al. |
| 5,028,226 A | | 7/1991 | De'ath, et al. |
| 5,037,285 A | | 8/1991 | Kudert et al. |
| 5,040,963 A | | 8/1991 | Beck et al. |
| 5,069,612 A | | 12/1991 | Teutsch et al. |
| 5,076,776 A | | 12/1991 | Yamada et al. |
| 5,078,589 A | | 1/1992 | Osuna-Diaz |
| 5,078,942 A | | 1/1992 | Sullivan et al. |
| 5,093,053 A | | 3/1992 | Eckardt et al. |
| 5,093,054 A | | 3/1992 | Hirota |
| 5,094,603 A | | 3/1992 | Gellert |
| 5,106,284 A | | 4/1992 | Kobayashi et al. |
| 5,125,817 A | | 6/1992 | Yamachika |
| 5,143,733 A | | 9/1992 | Von Buren et al. |
| 5,149,547 A | | 9/1992 | Gill |
| 5,169,648 A | | 12/1992 | Eckardt et al. |
| 5,200,207 A | | 4/1993 | Akselrud et al. |
| 5,206,032 A | | 4/1993 | Bock |
| 5,221,507 A | | 6/1993 | Beck et al. |
| 5,223,275 A | | 6/1993 | Gellert |
| 5,238,378 A | | 8/1993 | Gellert |
| 5,256,051 A | | 10/1993 | Langos et al. |
| 5,316,583 A | | 5/1994 | Milliman |
| 5,368,470 A | | 11/1994 | Manner |
| 5,383,257 A | | 1/1995 | Krauss |
| 5,385,461 A | | 1/1995 | Machida |
| 5,417,558 A | | 5/1995 | Heindel et al. |
| 5,443,378 A | | 8/1995 | Jaroschek et al. |
| 5,460,771 A | | 10/1995 | Mitchell et al. |
| 5,466,141 A | | 11/1995 | Eckardt et al. |
| 5,474,723 A | * | 12/1995 | Horikoshi .................. 264/45.5 |
| RE35,239 E | | 5/1996 | Wason et al. |
| 5,523,045 A | | 6/1996 | Kudert et al. |
| 5,531,581 A | | 7/1996 | Donnell, Jr. |
| 5,552,105 A | | 9/1996 | Konefal |
| 5,556,582 A | | 9/1996 | Kazmer |
| RE35,368 E | | 10/1996 | Mooney et al. |
| 5,562,931 A | | 10/1996 | Takeuchi |
| 5,595,799 A | | 1/1997 | Beck et al. |
| RE35,447 E | | 2/1997 | Garcia et al. |
| 5,599,568 A | | 2/1997 | Donnell, Jr. |
| 5,601,773 A | | 2/1997 | Schmidt et al. |
| 5,603,873 A | | 2/1997 | Ingram et al. |
| RE35,527 E | | 6/1997 | Martucci |
| 5,650,178 A | * | 7/1997 | Bemis et al. ................ 425/130 |
| 5,662,945 A | | 9/1997 | Konefal |
| 5,667,740 A | | 9/1997 | Spydevold |
| 5,696,176 A | | 12/1997 | Khemani et al. |
| 5,795,166 A | | 8/1998 | Meixler |
| 5,801,206 A | | 9/1998 | Khemani et al. |
| 5,824,400 A | | 10/1998 | Petrakis et al. |
| 5,862,571 A | | 1/1999 | Naft et al. |
| 5,891,381 A | * | 4/1999 | Bemis et al. ............. 264/328.8 |
| 5,916,605 A | | 6/1999 | Swenson et al. |
| 5,968,558 A | | 10/1999 | Kudert et al. |
| 5,972,258 A | | 10/1999 | Sicilia |
| 5,975,871 A | | 11/1999 | Kudert et al. |
| 5,985,188 A | | 11/1999 | Jennings et al. |
| 5,989,473 A | | 11/1999 | Haverty |
| 6,007,108 A | | 12/1999 | Braun |
| 6,020,393 A | | 2/2000 | Khemani |
| 6,024,903 A | | 2/2000 | Naft et al. |
| 6,062,840 A | | 5/2000 | Lee et al. |
| 6,089,468 A | | 7/2000 | Bouti |
| 6,177,036 B1 | * | 1/2001 | Van Der Hoeven et al. .......................... 264/45.9 |

* cited by examiner

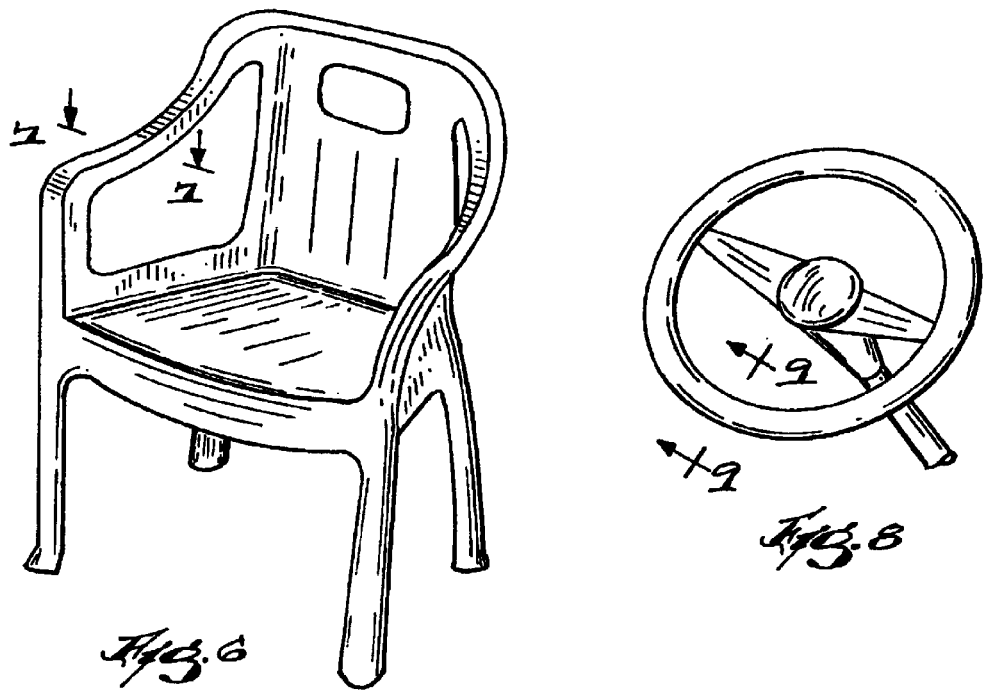
Fig. 6
Fig. 8
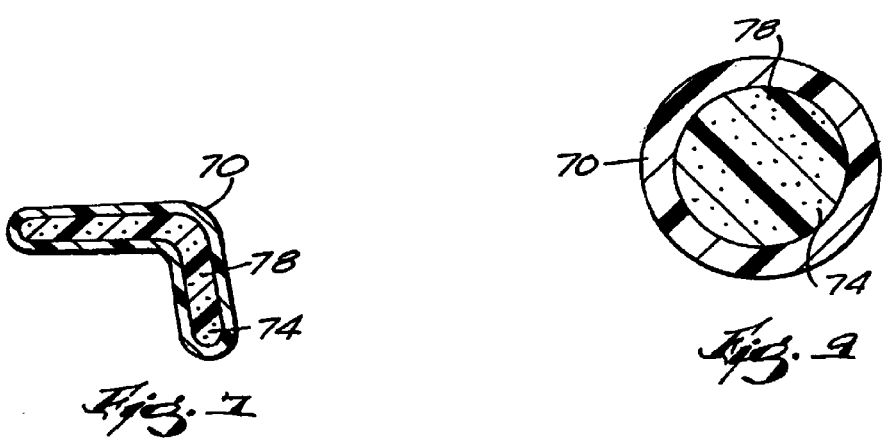
Fig. 7
Fig. 9

CO-INJECTION METHODS USING ENDOTHERMIC-BLOWING AGENTS AND PRODUCTS MADE THEREFROM

CROSS-REFERENCE TO RELATED APPLICATIONS

This application claims priority under 35 U.S.C. § 119 to U.S. provisional application Ser. No. 60/250,222 filed on Nov. 30, 2000, which is hereby fully incorporated by reference.

FIELD OF THE INVENTION

The invention relates to co-injection-molding methods, and more particularly to co-injection-molding methods using endothermic-blowing agents. The methods comprise injecting two different materials, typically an outer-skin material, and an inner-core material incorporating an endothermic-blowing agent, into a single-cavity or multi-cavity mold. The invention also relates to thermoplastic articles and resins made from these materials and methods.

BACKGROUND OF THE INVENTION

In co-injection methods, a co-injection manifold receives material, usually thermo-plastic, from two different injection units and combines the two materials into a single stream that flows into a mold or die. The manifold allows one material to be co-molded inside another during a single cycle. The co-injection manifold is thus located between the injection units and the mold. A typical co-injection manifold is fixed to the injection units.

Exothermic-blowing agents have been incorporated into thermo-plastics in mono-injection-molding methods and in other injection molding methods. A blowing agent is a substance incorporated into a mixture for the purpose of producing a foam. But the use of exothermic-blowing agents in mono-injection-molding methods has been limited to the production of end products, for which aesthetic concerns do not apply. In other words, using exothermic-blowing agents in conjunction with co-injection methods yields aesthetic and other problems for the following reasons.

First, using exothermic-blowing agents in the core material produces uneven blowing, which may cause voids in certain inner areas of the parts being produced. Because the blowing agent is exothermic, heat evolves unevenly during the foaming reaction, which accounts for the uneven blowing and the formation of voids in the core material.

Second, and somewhat related, it is difficult to keep the exothermic-blowing agent homogenized within the core material during production. As a result, when the exothermic-blowing agent is mixed with the inner-core material, a heterogeneous mixture tends to form, making it difficult to produce a high quality end product. For example, one part cycle may produce a part exhibiting high pockets of potency while a subsequent part cycle may produce a part exhibiting weaker pockets of potency. Keeping the blowing agent homogenized is critical to providing consistent "part feel" and structural integrity to the end product. "Part feel" describes the physical characteristics of the product, including how a part feels when touched by the hands of a consumer. Overall, it is difficult to regulate the amount of and homogenize the liquid-exothermic-blowing agent being introduced into the core material between part cycles while producing products.

Third, using exothermic-blowing agents results in irregular and inconsistent pressure being exerted on the outside walls of the part after removal from the die. Consequently, part size and shape are affected and many parts generated therefrom need to be scrapped. Controlling the pressure that the blowing agent exerts on the outside walls of the part after it is removed from the mold produces a part having a rounder, friendlier "part feel." A related problem associated with adding exothermic-blowing agents to core materials is that these blowing agents tend to migrate toward the surface or skin of the part, thereby affecting the aesthetic appearance of the surface. This has limited the use of exothermic-blowing agents for application in parts that are not aesthetically demanding.

Finally, when exothermic-blowing agents are used, slight temperature changes and variations result in complications in part sizes and part cycles. In other words, the exothermic-blowing agents are not very versatile, and require uniform, constant temperatures to produce a consistent, quality end product. Minor temperature changes and modifications are often required during coring processes to overcome aesthetic, size, or cycle issues. As a result, the use of exothermic-blowing agents in these injection molding methods is limited.

SUMMARY OF THE INVENTION

The present invention addresses these needs by providing co-injection methods that employ endothermic-blowing agents which absorb heat during the co-injection process.

Accordingly, the invention provides a method of co-injection molding that includes mixing a plastic inner material and an endothermic-blowing agent to form a core mixture. A plastic outer material is injected from a first injection unit into a co-injection manifold to create a flow of outer material therethrough. The core mixture is injected from a second injection unit into the co-injection manifold to create a flow of core mixture therethrough. The flow of the outer material and the flow of the core mixture are then controlled through the co-injection manifold and into a mold cavity. The core mixture is thereby co-injection molded inside the outer material. The core mixture expands as heat is provided for the endothermic-blowing agent to absorb.

In another aspect, the present invention also provides co-injected plastic articles manufactured by co-injection processes. The co-injection processes include melting an inner material and an endothermic-blowing agent to form a core mixture, injecting a plastic outer material from a first injection unit through a co-injection manifold and into a mold cavity, and injecting the core mixture from a second injection unit through the co-injection manifold and into the mold cavity, thereby co-injection molding at least a portion of the core mixture inside the outer material in the mold cavity. The core mixture expands when heat is provided for the endothermic-blowing agent therein to absorb. Once the outer material and core mixtures are allowed to cool in the mold cavity, a co-injected plastic article is formed. About 20 to 45 percent by volume of the article is inner material and about 0.1 to 4.0 percent by volume of the inner material is endothermic-blowing agent.

In another aspect, the invention provides a method for manufacturing an engineering-grade resin. The method includes adding an endothermic-blowing agent to an inner material, exposing the blowing agent and inner material to a temperature between about 300–600° F. and a pressure between about 5,000–25,000 PSI to form a core mixture. An outer thermoplastic material is injected from a first injection unit through a co-injection manifold and into a mold cavity, and the core mixture is injected from a second injection unit through the co-injection manifold and into the mold cavity to create the resin. The outer material insulates the core mixture in the resin, and the resin is capable of forming a plastic article upon being cooled.

The present invention also provides for a method of co-injection molding including mixing an inner material and an endothermic-blowing agent to form a core mixture. The method also includes controlling the flow of the outer material and the core mixture through a co-injection manifold and into a mold cavity in order to co-mold the core mixture inside the outer material. The core mixture expands when heat is provided for the endothermic-blowing agent to absorb.

In another aspect, the present invention also provides for the manufacture of co-injected plastic articles produced by processes including mixing an inner material and an endothermic-blowing agent to form a core mixture. The processes also include controlling the flow of the outer material and the core mixture through a co-injection manifold and into a mold cavity in order to co-mold the core mixture inside the outer material. The core mixture expands when heat is provided for the endothermic-blowing agent to absorb.

Other features and advantages of the invention will become apparent to those skilled in the art upon review of the following detailed description and claims. Before embodiments of the invention are explained in detail, it is to be understood that the invention is not limited in its application to the details of the composition and concentration of components set forth in the following description. The invention is capable of other embodiments and of being practiced or being carried out in various ways. Also, it is understood that the phraseology and terminology used herein is for the purpose of description and should not be regarded as limiting.

Unless explicitly stated otherwise, the order in which the steps or acts in the methods described herein are performed, and more particularly, the order in which the steps or acts in the methods claimed herein are performed may vary. Unless explicitly stated otherwise, just because one step or act is listed or described before another does not necessarily mean that step or act must be performed before the other.

BRIEF DESCRIPTION OF THE DRAWINGS

FIG. 6 is a perspective view of a piece of lawn furniture embodying the invention.

FIG. 7 is a cross-sectional view taken along line 7—7 in FIG. 6.

FIG. 8 is a perspective view of a steering wheel embodying the invention.

FIG. 9 is a cross-sectional view taken along line 9—9 in FIG. 8.

DETAILED DESCRIPTION OF THE INVENTION

Figure 1:
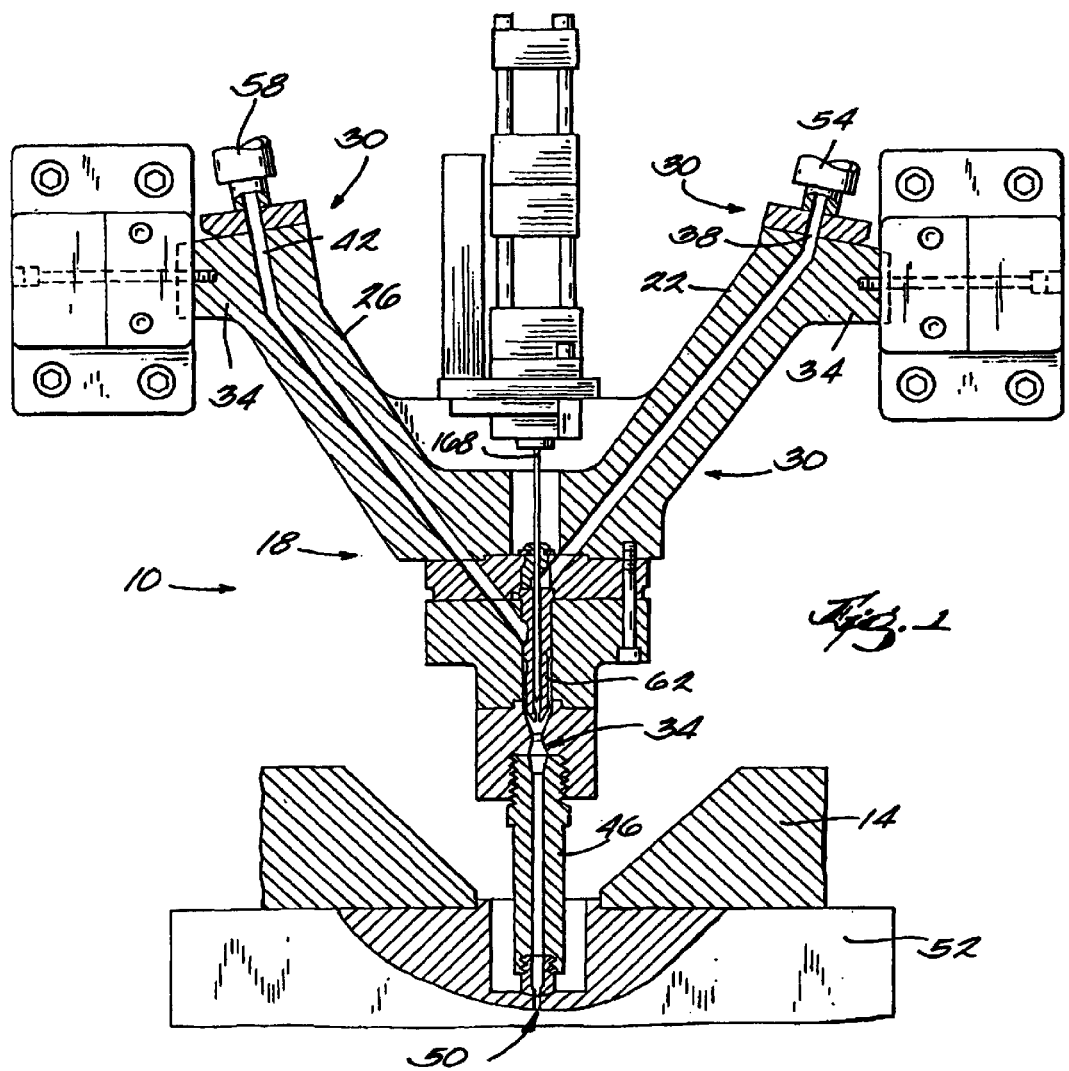
FIG. 1 is a cross-section view of a co-injection manifold that may be used in the methods of the present invention.

As used herein, the term "co-injection molding" is meant to refer to a process by which two like or dissimilar plastics (e.g. an outer/skin material and an inner/core material) originating from different sources (e.g. injection units) are injected into a single mold during a single cycle, thereby co-molding the inner/core material inside the outer/skin material. The co-injection of the plastics may be either simultaneous or sequential as further described below.

As used herein, the terms "outer-skin material," "skin material" and "outer material" are synonymous. The outer-skin materials suitable for use in the methods of the invention and the plastic articles and resins produced therefrom include, but are in no way limited to, a variety of synthetic thermoplastic resins and thermoplastic polyesters. For example, polycarbonates (PC), polycarbonate polyterephthalates (PCPT), polyethylene terephthalates (PET), polycarbonate polyethylene terephthalates (PCPET), polybutylene terephthalates (PBT), polycarbonate polybutylene terephthalates (PCPBT), polypropylene, glass-filled polypropylene, nylons, "NORYL"® manufactured by General Electric and "XENOY"® manufactured by General Electric are all suitable for use as outer-skin materials in the methods and articles described herein.

As used herein, the terms "inner-core material," "core material" and "inner material" are synonymous. The inner-core materials suitable for use in the methods of the invention and the plastic articles produced therefrom include, but are in no way limited to, a wide variety of thermoplastics. The inner-core material may comprise the same materials found in the outer skin-material. The inner material may also comprise recycled, or ground-up, skin material or skin material that is discolored or otherwise aesthetically unappealing. In other words, plastic articles made from the co-injection methods described herein, which do not meet product specifications, can be ground-up, and used as inner-core material. But the inner-core material must have a viscosity that is higher than that of the outer-skin material. In other words, the inner material must be stiffer than the outer material to prevent the inner material from "blowing out" the outer material. Specific examples of core material include polypropylenes and polystyrenes. The inner-core material may also include recycled endothermic-blowing agents.

As used herein, a "single cycle" refers to one cycle of a co-injection apparatus, and comprises five steps: 1) closing the mold; 2) co-injecting the plastics; 3) packing and holding; 4) cooling and 5) opening the mold. A further description of these five steps directly follows.

First, closing the mold prepares the mold for the plastic injection and builds clamp tonnage.

Second, co-injecting the plastics can be either simultaneous or sequential. Typically, plastics are injected through a co-injection manifold and into the mold at temperatures around 300–600° F. and pressures of 5,000 to 25,000 PSI. The co-injection manifold is typically located between injection units and a mold. A typical co-injection manifold is fixed to the injection units. U.S. Pat. No. 4,376,625 issued to Eckardt; U.S. Pat. No. 5,650,178 issued to Bemis; and U.S. Pat. No. 5,891,381 issued to Bemis, each of which is hereby incorporated by reference, disclose suitable co-injection manifolds and co-injection apparatuses which can be used to carry out the methods described herein.

U.S. Pat. No. 4,376,625 discloses one example of a co-injection manifold mounted on an injection unit suitable for use with the invention. Another injection unit communicates with the co-injection manifold via a tube. The manifold has a forwardly opening outlet, an annual port axially behind or upstream of the outlet, and a central port axially behind or upstream of the annular port. One injection unit communicates with the central port, and the other injection unit communicates with the annular port. A valve member is movable between a fully forward position blocking both of the ports, an intermediate position blocking only the central port, and a rearward position clear of both ports. In the fully forward position, no material flows through the outlet and into the mold. In the intermediate position, only material from the annular port flows through the outlet and into the mold. In the rearward position, both material from the annular port and material from the central port flow through the outlet and into the mold.

U.S. Pat. No. 5,650,178 illustrates another example of a co-injection apparatus, which is illustrated in FIG. 1. The apparatus 10 comprises (see FIG. 1) a co-injection manifold 30 mounted relative to the platen 14. The co-injection manifold 30 comprises a nozzle housing 18 having forward and rearward ends. The nozzle housing 34 is generally V-shaped and includes angularly spaced first and second or right and left arms 22 and 26. Each arm has a rearward end 30 and includes an outwardly extending mounting portion 34. The nozzle housing 18 has an outlet 36 in its forward end, a first inlet 38 in the rearward end of the first arm 22, and a second inlet 42 in the rearward end of the second arm 26. The outlet 34 is located on a horizontal axis extending from the forward to rearward. The outlet 36 communicates with a nozzle 46 that communicates with the mold cavity inlet 50, and ultimately the mold 52 and mold cavity (not shown). The inlets 38 and 42 communicate with injection nozzles 54 and 58 of respective injection units (not shown). In the illustrated construction, the injection nozzle 54 injects the inner core material and the nozzle 58 injects the outer skin material. The apparatus may also include a nozzle pin 62.

U.S. Pat. No. 5,891,381 discloses another injection molding apparatus that can be used in conjunction with the methods described herein. The apparatus includes a first mold cavity having an inlet, a second mold cavity having an inlet, a source of a first material to be injected, a source of a second material to be injected, and a co-injection manifold. The manifold includes a nozzle housing including a first outlet adapted to communicate with the first mold cavity inlet and a second outlet adapted to communicate with the second mold cavity inlet. First and second spaced apart inlets are respectively adapted to communicate with the first and second sources of material to be injected. A first passageway communicates between the first inlet and the first and second outlets, and a second passageway communicates between the second inlet and the first and second outlets.

An additional manifold may also be located in the mold itself, leading into the mold cavity. Thus, the apparatuses used to perform the methods and make the products described herein may use a plurality of manifolds. A wide variety of co-injection apparatuses and co-injection manifolds can be used in conjunction with the invention, and should not be limited by those set forth above.

Again, the plastic co-injection can be either simultaneous or sequential. For simultaneous plastic co-injection, a skin or outer material is injected from a first injection unit (usually through a manifold such as those described above) and into a mold cavity. The flow of the outer material into the mold may then be slowed as an inner or core material from a second source or barrel is injected into the mold, (usually through a co-injection manifold), along with the outer material. In other words, the outer and core mixture may flow concurrently or simultaneously into the mold cavity. This allows the core material to be injected inside the outer material. Subsequently, the outer and core material flow can be terminated substantially simultaneously, or alternatively, the flow of the core material may be stopped while the outer material continues to flow to finish off the part. Alternatively, simultaneous plastic injection may comprise injecting the outer material from a first source into the mold cavity, then injecting a core material into the mold cavity such that core material and outer material simultaneously enter the mold cavity, terminating the flow of the outer material while allowing the core material to continue to flow, terminating the flow of the core material, and resuming and subsequently terminating the flow of the outer material in order to complete the production of a part.

When using sequential plastic co-injection, outer material from a first source is first injected into the manifold to create a flow of outer material into the mold and the mold cavity. The flow of outer material into the mold cavity is then stopped. The outer material may fill approximately 30–50 percent of the mold cavity. Subsequently, the outer material from a second source is used to fill the remainder of the mold cavity and finish the part, or alternatively, the outer material is injected into the mold cavity and toward the very end of the plastic injection, the flow of the outer material may be stopped and the injection of the outer material resumed to provide a better cosmetic appearance to the end product.

After the co-injection of the plastics, the co-injected plastics are exposed to the third step in the single cycle, i.e. the "pack and hold." During the pack and hold, the pressure is reduced to anywhere between around 400–1200 PSI and the temperature is also gradually reduced. As the plastic cools, it begins to contract. As a result, the reduced pressure is still maintained and some additional plastic (either skin or outer material) may be introduced into the mold. Fourth, after the "pack and hold," the pressure is further reduced and the part is cooled to around 100° F. while the part remains in the mold cavity. Finally, the mold is opened and the finished part is removed to complete the single cycle.

Overall, "co-injection molding" is meant to encompass co-injection methods whereby a core material enters the mold cavity wrapped in a blanket of skin material. In other words, two materials from different sources are substantially simultaneously or sequentially injected into a single mold during a single cycle. Co-injection molding, on the other hand, is not meant to refer to forming a part, cooling it, and then layering a material over the cooled-part. Co-injection molding is also different from filling one cavity of a two-cavity mold with one material from one barrel and then filling the other cavity with a different material from a second barrel. It is also not meant to refer to processes that use gas as a core material and then let the gas dissipate to atmosphere-gas assist. Finally, co-injection molding does not include providing a previously-made part and then molding a surface partly or completely thereover. In other words, co-injection molding is different from insert molding or overmolding. None of these processes provide the insulation blanket the skin material provides in co-injection.

The methods provided by the invention add a variety of endothermic-blowing agents (described below) to the core material as part of the co-injection methods described above. The term "foaming agent" or "blowing agent" is used to describe any substance which, alone or in combination with other substances, is capable of producing a cellular structure in a plastic or rubber mass. Thus, "foaming agents" and "blowing agents" include soluble solids that leave pores when pressure is released, soluble solids that leave pores when leached out, liquids which develop cells when they change to gases, and chemical agents that decompose or react under the influence of heat to form a gas. An "endothermic-foaming agent" or "endothermic-blowing agent" is a foaming agent or blowing agent that absorbs heat. The endothermic-blowing agent is added to the core material before the core material is injected in order to form a "core mixture". The core mixture should have a higher viscosity and stiffness as compared to the outer-skin materials. This prevents the core mixture from protruding through the outer material, i.e., "blowing out." A number of endothermic-blowing agents suitable for use in the methods described herein are described below. In no way should the description of these blowing agents be construed as limiting the scope of the invention. Any blowing agent having endothermic properties is suitable.

Solid-endothermic-blowing agents are typically employed in pellet form. The actual blowing agent may dust a carrier pellet, such as a low-density polyethylene bead. Liquid-blowing agents are generally employed in a proprietary carrier, such as a fatty acid ester, a mineral oil or a polyol.

Known liquid foaming agents include certain aliphatic and halogenated hydrocarbons, low boiling alcohols, ethers, ketones, and aromatic hydrocarbons. Chemical foaming agents range from simple salts such as ammonium or sodium bicarbonate to complex nitrogen releasing agents, of which azobisformamide is an important example.

Foaming agents are generally classified as physical or chemical. Chemical foaming agents (generally solids) undergo a chemical transformation when producing gas, while physical foaming agents undergo a generally reversible physical change of state, e.g., vaporization.

Physical foaming agents include liquid agents. Liquid physical foaming agents include volatile liquids which produce gas through vaporization. Common liquid physical foaming agents generally include shortchain aliphatic hydrocarbons (C5 to C7) and their chlorinated and fluorinated analogs. Liquid physical foaming agents may be used over a wide temperature range in low pressure and atmospheric processes, and are widely used to produce low density thermoplastics, such as foamed polystyrene, and thermoset polymers, such as polyesters, epoxy, and polyurethane foam systems.

Chemical foaming agents commonly referred to as blowing agents are generally solids that liberate gas(es) by means of a chemical reaction or decomposition when heated. They are necessarily selected for specific applications or processes based on their decomposition temperatures. In this regard, it is important to match the decomposition temperature with the processing temperature of the polymer to be formed. If the polymer processes at temperatures below that of the chemical foaming agent, little or no foaming will occur. If the process temperature is significantly above the foaming agent's decomposition temperature, poor (overblown, ruptured) cell structure and surface skin quality will likely result.

Chemical foaming or blowing agents may be either inorganic or organic. The most common inorganic foaming agent is sodium bicarbonate. Sodium bicarbonate is inexpensive, nonflammable and begins to decompose at a low temperature; however, it is used only to a very limited extent in thermoplastics. Differential thermal analysis has shown that sodium bicarbonate decomposes over a broad temperature range and this range is endothermic, contributes to an open cell structure in the finished product, and the released gas (carbon dioxide) diffuses through the polymer at a much greater rate than nitrogen gas.

Endothermic chemical foaming or blowing agents are mostly mixtures of sodium bicarbonate and sodium hydrogen citrate. The citrate is incorporated together with the sodium bicarbonate in order to facilitate a complete acid assisted decomposition reaction to produce carbon dioxide gas. The mixture is also available in various polymers as concentrates. The mixture is also available as a hydrophobized acid and carbonate which is a free non-dusting powder.

Organic foaming or blowing agents can be utilized in most polymer applications and processes. These compounds release gas (usually nitrogen and/or ammonia) over a narrow temperature range. The rate of gas evolution for a given chemical foaming or blowing agent is determined by a temperature and time relationship. Applications for chemical foaming agents are generally divided into three areas: low, medium and high temperature processing polymers. There are numerous organic foaming agents available that decompose at various temperatures.

In these co-injection methods, the endothermic-blowing agents, in liquid or solid form, are added to the inner-core material to form a core mixture preferably before the core mixture is injected into the mold, and more preferably the core mixture is injected into the manifold. Typically, these blowing agents are added in amount equal to about 0.1 to about 4 percent by volume of the core material. Preferably, the blowing agent is 0.5–3.0 percent by volume of the core material, and more preferably, 1.0–2.0 percent by volume of the core material. Typically, the core material is about 20 to about 45 percent by volume of the final part, with the remainder being skin material and any other impurities.

When using liquid-endothermic-blowing agents, a peristatlic-type pump may be employed to introduce the blowing agent directly into the injection unit containing the core material. Peristatlic pumps were originally employed in the medical industry in order to accurately administer liquids to patients. Liquid blowing agents are preferred because a peristaltic volumetric pump can be used to introduce the blowing agents into the core material uniformly and consistently. In other words, this metering provides better reliability and repeatability than using solid pellets or beads. Pellets and beads may tend to bunch, thereby inhibiting uniform distribution into the core material. Once the peristatlic-type pump delivers the blowing agent into the injection unit, the liquid agent is integrated therein once the core material is melted (again at temperatures around 300–600° F.). A peristatlic-type pump is only one example of an apparatus used to deliver a liquid endothermic blowing agent into the injection unit.

Alternatively, when solid-endothermic-blowing agents are used (usually in pellet form as further described above), a "weight and loss feeder" may be used to meter, weigh and feed the solid pellets into the injection unit containing the core material. In other words, the feeder weighs the core material and is programmed to provide a percentage by volume of blowing agent to the core material. Conair manufactures weight and loss feeders, while Millicron sells such feeders. Those of ordinary skill in the art will be familiar with "weight and loss feeders" and other ways to deliver the solid blowing agents into the core material.

In order to trigger the foaming or blowing reaction, whereby the core mixture comprising the endothermic-blowing agent and the inner-core material begins to expand, heat must be provided because the blowing agent is endothermic. Heat can be provided in a variety of manners. First, the endothermic-blowing agent can absorb heat from the skin material after the skin material and core mixture have been injected into the mold. In other words, the inner material incorporates the endothermic-blowing agent, and enters the mold cavity wrapped in the skin material. The skin material acts as an electric blanket of sort and an insulator, thereby providing uniform heat exposure to the core mixture. The skin material remains at a uniform temperature because of its inherent insulating abilities. Accordingly, the surface of the molded product exhibits a constant temperature for interaction with the core mixture, which provides the heat-activated-blowing agent within the core material with a controlled exposure to temperature. One of the benefits of uniform temperature exposure includes uniform blowing throughout the part. Also, a reduction in the ratio of blowing agent to core material can be achieved because there is no need to overload the agent in an effort to compensate for cold pocket areas. The benefits of uniform insulation are not available in mono-injection molding methods because no skin material is used, which causes the internal temperature of the product to vary. Alternatively, frictional heat may be provided to induce the foaming reaction. More particularly, frictional heat may be provided as the core mixture moves through manifold and is ultimately injected into the mold.

In contrast, by using mono-injection methods, plastics containing exothermic blowing agents are exposed to a variety of temperatures during the molding process. For example, in a hopper, the plastic drops into a feed section in which temperatures are significantly higher than ambient. In the metering section of the barrel, the plastics are exposed to high temperatures in order to melt the plastic. Finally, as the plastics enter the cavity of the mold, the temperature drops significantly. That temperature however, is unevenly applied in the mold because it is cooled by a series of water channels which, even, in the best molds, cool the plastic unevenly. Again, this is much different from co-injection molding in which the skin material acts as an insulating blanket to the core material.

Using an endothermic-blowing agent in co-injection methods provides several advantages over and addresses many of the problems caused by using exothermic-blowing agents. First, the cost-per-part is reduced due to reductions in cycle time and the overall weight of the material. Cycle times are reduced, in part, because the endothermic end-products do not require as much "cool-down" as exothermic end-products after being injected. Similarly, the "packing and holding" step of a single cycle may no longer be necessary. Again, the endothermic agents absorb heat, rather than give off heat.

Second, although endothermic-blowing agents are designed to activate at a specific temperature. The outer-skin material insulates the core mixture comprising the endothermic material at a uniform specific maximum temperature. Again, mono-injection methods do not provide skin material, making activation difficult to control because of the lack of uniform heat. The controlled post-mold blowing identified with using endothermic materials provides products having a more rounded contour, and consequently a better "part feel."

Third, endothermic-blowing agents require heat to react, which means they withdraw nearly identical amounts of heat from all areas of the mold, thereby producing uniform blowing or foaming throughout the part. In contrast, blowing or foaming throughout a part or product varies dramatically when an exothermic blowing agent is used in injection methods. As a result, parts produced from endothermic-blowing agents possess evenly distributed plastic foam without the voids so commonly associated with exothermic parts.

Another advantage to using endothermic-blowing agents is that parts that do not meet production standards can be ground-up and reused as core material. In contrast, it is difficult to reuse exothermic parts because not all of the exothermic agent activates in the thinner areas of these parts. Thus, once ground-up for reuse or recycling, there is no way to confine or segregate ground particles containing the non-activated-exothermic-blowing agent. Accordingly, reusing or recycling this material can be very unpredictable. Often, reusing ground-up materials including exothermic results in the product blowing up once the product leaves the mold at standard cycle time. In contrast, endothermic-blowing agents tend to fully activate during the processes described herein, and therefore are entirely "spent." As a result, this material can be reground and reliably reused as core material.

Endothermic-blowing agents also tend to remain homogenized when added to the inner-core material. Using endothermic-blowing agents reduces cycle times five to ten percent and produces parts having stable sizes and profiles. Using endothermic-blowing agents yield faster cycles by reducing the need for external cooling because the endothermic-blowing agents absorb heat.

Other advantages associated with using endothermic foaming or blowing agents over their exothermic counterparts include shorter degassing cycles, smaller cells and smoother surfaces. These advantages yield products and parts having uniform physical properties and substantially less voids and areas of dense and weak foaming. Using an endothermic-blowing agent results in products having improved structure and insulation.

Figure 2:
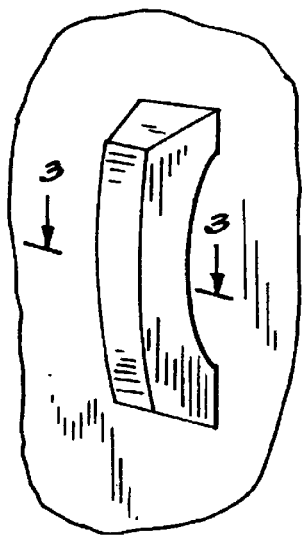
FIG. 2 is a perspective view of a handle embodying the invention.
Figure 4:
FIG. 4 is a perspective view of a handle for a wheelchair embodying the invention.
Figure 3:
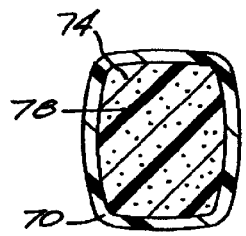
FIG. 3 is a cross-sectional view taken along line 3—3 in FIG. 2.
Figure 5:
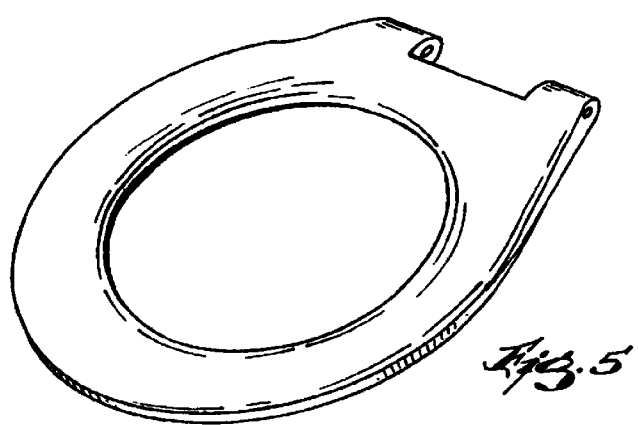
FIG. 5 is a perspective view of a toilet seat embodying the invention.
Figure 10:
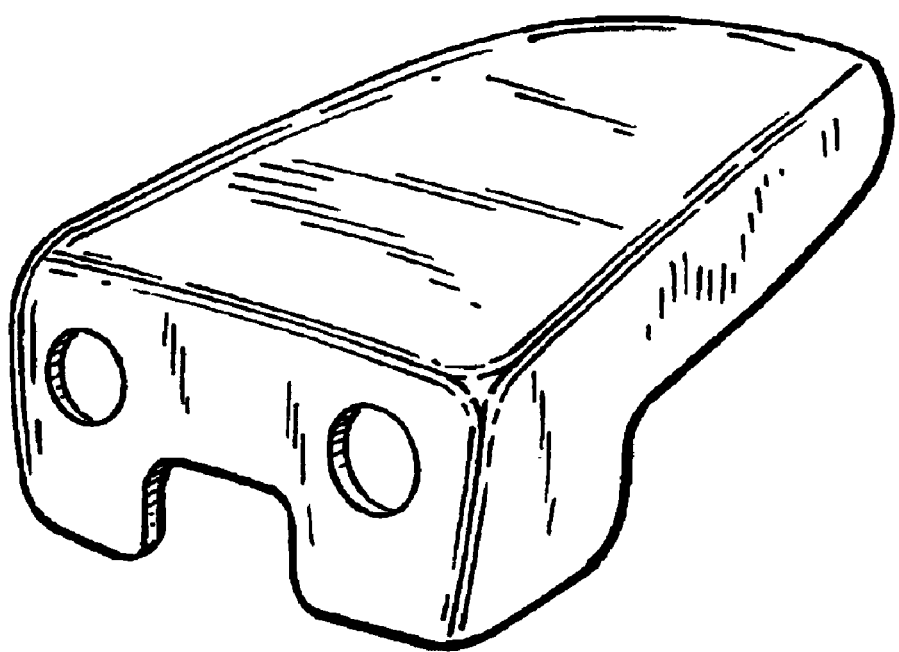
FIG. 10 is a perspective view of a hood for a vehicle embodying the invention.

The methods described herein can be used to produce a wide variety of final plastic apparatuses and end products, which will become apparent to one of ordinary skill in the art. For example, thick and thin-walled handles for electric appliances can be produced using these methods. More specifically, handles for refrigerators, ovens, etc. (FIG. 2) can be made using the methods described herein. Plastic handles for wheelchairs (FIG. 4) can also be made from these methods. Also, plastic hoods (FIG. 10) for vehicles such as tractors and lawn mowers can also be made, as well as toilet seats (FIG. 5), lawn furniture (FIG. 7) and plastic steering wheels (FIG. 8). In the figures, outer material is depicted as reference numeral 70, inner material as 74 and endothermic-blowing agent as 78. The real key to the production of any of these end products is the production of an engineering-grade resin. The engineering grade resin comprises the thermoplastic-outer material, a thermoplastic-inner material and an endothermic-blowing agent, and can be used to produce an unlimited amount of molded-plastic products, such as those described above. Accordingly, these applications should no way be construed as limiting the scope of the invention.

EXAMPLE 1

Using "XENOY"® (material (manufactured by General Electric) as a skin material, and either "XENOY"® regrind, "XENOY"® off-specification material, or a combination thereof, as a core material combined with an endothermic blowing agent, a lawn tractor hood can be co-injected at a significantly reduced price. The resultant hoods are every bit as a strong and outdoor-exposure resistant as a mono-injected part using exothermic-blowing agents. The significant advantage of using the endothermic-blowing agent is that the structural integrity of the part is not compromised because of nearly perfect uniform blowing of the core material. No area of the hood is structurally compromised as would typically be found when using an inherently unevenly-blown-exothermic-activated-foamed core.

Even though the materials (both skin and core) have virtually identical viscosities in this example, by reducing the core melt temperature approximately 50 degrees Fahrenheit, the part is artificially stiffer, thereby maintaining the appropriate stiffer core requirement of co-injection molding intact.

EXAMPLE 2

A plastic handle for a kitchen appliance was manufactured using a co-injection method. An endothermic-blowing agent was added to a core material (polypropylene/polyethylene) in an injection unit to form a core mixture. Another injection unit was supplied with a glass-filled co-polymer polypropylene skin material. The skin material was injected through a co-injection manifold and into a mold from the injection unit. Subsequently, the core mixture was injected into the mold. The skin material was further injected to finish off the plastic handle. The end plastic handle comprised 72.6 percent by volume of the skin material, 27.3 percent by volume of the core material and the remainder endothermic-blowing agent.

We claim:

1. A method of co-injection molding, the method comprising:

mixing a plastic inner material and an endothermic-blowing agent to form a core mixture;

injecting a plastic outer material from a first injection unit into a co-injection manifold to create a flow of outer material therethrough;

injecting the core mixture from a second injection unit into the co-injection manifold to create a flow of core mixture therethrough;

allowing the core mixture to enter the mold cavity only after the outer material enters the mold cavity, and then allowing the core mixture and the outer material to flow into the mold cavity concurrently, thereby co-injection molding the core mixture inside the outer material;

stopping the flow of the outer material after the outer material concurrently flows with the core mixture, thereby allowing the core mixture to remain flowing;

stopping the flow of the core mixture into the mold cavity, and resuming the flow of the outer material into the mold cavity; and expanding the core mixture by providing heat for the endothermic-blowing agent to absorb.

2. The method of claim 1, whereby providing heat for the endothermic-blowing agent to absorb occurs before the outer material and the core mixture are injected into the manifold.

3. The method of claim 1, whereby providing heat for the endothermic-blowing agent to absorb occurs after the outer material and the core mixture have been injected into the manifold.

4. The method of claim 1, whereby providing heat for the endothermic-blowing agent to absorb occurs while the outer material and the core mixture are being controlled through the manifold.

5. The method of claim 1, wherein the endothermic-blowing agent comprises a mixture of sodium bicarbonate and sodium hydrogen citrate.

6. The method of claim 1, wherein the endothermic-blowing agent includes at least one of aliphatic and halogenated hydrocarbons, low boiling alcohols, ethers, ketones, aromatic hydrocarbons and simple salts.

7. The method of claim 6, wherein the endothermic-blowing agent comprises at least one simple salt, and the simple salt comprises at least one of ammonium bicarbonate, sodium bicarbonate and azobisformamide.

8. The method of claim 1, wherein the inner material and the blowing agent are exposed to a temperature between about 300 to 600° F. and a pressure between about 5,000 to 25,000 PSI to form the core mixture.

9. The method of claim 1, wherein the blowing agent is about 0.5 to 3.0 percent by volume of the inner material.

10. The method of claim 1, wherein the blowing agent is about 1.0 to 2.0 percent by volume of the inner material.

* * * * *